US 6,598,030 B1

(12) United States Patent
Siegel et al.

(10) Patent No.: US 6,598,030 B1
(45) Date of Patent: *Jul. 22, 2003

(54) METHOD AND APPARATUS FOR PATTERN GENERATION

(75) Inventors: Kevin P. Siegel, Fremont, CA (US);
Patrick L. Faith, Pleasanton, CA (US);
Theodore P. Washburne, San Jose, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/454,696

(22) Filed: Dec. 3, 1999

Related U.S. Application Data (63) Continuation of application No. 08/863,443, filed on May 27, 1997, now Pat. No. 6,018,723.

(51) Int. Cl.[7] .............................................. G06F 17/60
(52) U.S. Cl. ......................... 705/38; 705/39; 705/42; 705/44
(58) Field of Search ............................. 705/1, 35, 38, 705/39, 42, 43, 44; 700/91, 92; 706/46, 47, 48

(56) References Cited

U.S. PATENT DOCUMENTS

| 4,326,259 A | 4/1982 | Cooper et al. ............... 708/212 |
| 4,346,442 A | 8/1982 | Musmanno ................... 705/36 |
| 4,376,978 A | 3/1983 | Musmanno ................... 705/36 |
| 4,562,341 A | 12/1985 | Ohmae et al. ............... 235/379 |
| 4,597,046 A | 6/1986 | Musmanno et al. .......... 705/36 |
| 4,718,009 A | 1/1988 | Cuervo ......................... 705/38 |
| 4,734,564 A | 3/1988 | Boston et al. ............... 235/380 |
| 4,736,294 A | 4/1988 | Gill et al. ..................... 705/38 |
| 4,760,604 A | 7/1988 | Cooper et al. ............... 382/155 |
| 4,774,663 A | 9/1988 | Musmanno et al. .......... 705/36 |
| 4,774,664 A | 9/1988 | Campbell et al. ............. 705/38 |
| 4,812,628 A | 3/1989 | Boston et al. ............... 235/380 |

(List continued on next page.)

FOREIGN PATENT DOCUMENTS

| CA | 2086269 | 6/1994 |
| DE | 2257200 | 11/1972 |
| EP | 0 440515 A1 | 8/1991 |
| EP | 0 468229 A3 | 5/1992 |

(List continued on next page.)

OTHER PUBLICATIONS

Visa International, Service Tarot Preliminary Business Case, pp. 2–27, Nov. 28, 1994.
Associated Credit Bureaus, Inc., Metro Format for Consumer Credit Reporting, pp. 1–69, Jan. 1, 1994.

(List continued on next page.)

Primary Examiner—Wynn W. Coggins
Assistant Examiner—Nicholas David Rosen
(74) Attorney, Agent, or Firm—Beyer Weaver & Thomas LLP (57) ABSTRACT

Methods and apparatus for transforming scoreable transaction data into financial data features are disclosed. In one aspect, a computer-implemented method transforms transaction data into a financial data feature for assessing credit risks. The financial data feature is extracted from the transaction data. The method involves obtaining the transaction data from a data source, and performing a set of operations on the transaction data to transform the transaction data into the financial data feature. The set of operations is selected only from a predefined set of classes of operations which are interrelated by a predefined order of precedence. Each operation in the set of operations is performed in an order based on the predefined order of precedence of a class associated with each operator.

8 Claims, 4 Drawing Sheets

U.S. PATENT DOCUMENTS

| | | | |
|---|---|---|---|
| 4,868,866 A | 9/1989 | Williams, Jr. | 707/9 |
| 4,914,587 A | 4/1990 | Clouse | 705/38 |
| 4,953,085 A | 8/1990 | Atkins | 705/36 |
| 5,025,138 A | 6/1991 | Cuervo | 705/38 |
| 5,038,284 A | 8/1991 | Kramer | 705/37 |
| 5,161,103 A | 11/1992 | Kosaka et al. | 705/36 |
| 5,177,342 A | 1/1993 | Adams | 235/379 |
| 5,210,687 A | 5/1993 | Woflberg et al. | 705/36 |
| 5,231,570 A | 7/1993 | Lee | 705/38 |
| 5,239,462 A | 8/1993 | Jones et al. | 705/38 |
| 5,262,941 A | 11/1993 | Saladin et al. | 705/38 |
| 5,274,547 A | 12/1993 | Zoffell et al. | 705/38 |
| 5,323,315 A | 6/1994 | Highbloom | 705/38 |
| 5,325,298 A | 6/1994 | Gallant | 704/9 |
| 5,361,201 A | 11/1994 | Jost et al. | 705/35 |
| 5,398,300 A | 3/1995 | Levey | 706/16 |
| 5,444,819 A | 8/1995 | Negishi | 706/21 |
| 5,479,573 A | 12/1995 | Keeler et al. | 706/21 |
| 5,577,169 A * | 11/1996 | Prezioso | 706/52 |
| 5,619,621 A * | 4/1997 | Puckett | 706/57 |
| 5,627,886 A * | 5/1997 | Bowman | 379/111 |
| 5,630,127 A | 5/1997 | Moore et al. | 705/1 |
| 5,649,116 A | 7/1997 | McCoy et al. | 705/38 |
| 5,679,938 A | 10/1997 | Templeton et al. | 235/379 |
| 5,679,940 A | 10/1997 | Templeton et al. | 235/380 |
| 5,696,907 A * | 12/1997 | Tom | 705/38 |
| 5,717,923 A | 2/1998 | Dedrick | 707/102 |
| 5,719,918 A | 2/1998 | Serbetciouglu et al. | 380/271 |
| 5,732,400 A | 3/1998 | Mandler et al. | 705/26 |
| 5,754,737 A * | 5/1998 | Gipson | 706/11 |
| 5,797,133 A | 8/1998 | Jones et al. | 705/38 |
| 5,815,638 A * | 9/1998 | Lenz et al. | 706/15 |
| 5,819,226 A | 10/1998 | Gopinathan et al. | 705/44 |
| 6,088,686 A * | 7/2000 | Walker et al. | 705/38 |
| 6,105,007 A * | 8/2000 | Norris | 705/38 |
| 6,182,060 B1 * | 1/2001 | Hedgcock | 707/1 |
| 6,253,186 B1 * | 6/2001 | Pendleton, Jr. | 705/2 |

FOREIGN PATENT DOCUMENTS

| | | |
|---|---|---|
| EP | 0 468229 A2 | 5/1992 |
| EP | 0 709811 A2 | 5/1996 |
| WO | 92/04679 | 3/1992 |
| WO | 94/06103 | 3/1994 |
| WO | 94/20912 | 9/1994 |
| WO | 96/30850 | 10/1996 |
| WO | 97/00483 | 1/1997 |

OTHER PUBLICATIONS

"Vertrauen auf Gegenseitigkeit", IBM Nachrichten 37, 1987 Heft 291, pp. 46–49.

Cooper et al., "Adaptive Pattern Recognition: Neural Networks in Real World Applications", Jun. 18, 1989, Tutorial IEEE/INNS International Joint conference on Neural Networks.

Robert Hecht–Nielsen, "Theory of the Backpropagation Neural Network", Department of Electrical and Computer Engineering, University of California at San Diego, La Jolla, CA.

Gullo, "Neural Nets Versus Card Fraud, Chase's Software Learns to Detect Potential Crime", Feb. 2, 1990, American Banker.

Caudill et al., "Neural Network Applications", 1990 Naturally Intelligent Systems, A Bradford Book, The MIT Press pp. 241–247.

EPO, International Search Report, Sep. 22, 1998, PCT/US98/10740.

McClure, "Taking the Risk Out of Transactions", Mar. 1994, USA, Security Management vol. suppl. issue, pp. 23A–24A, XP–002076870, ISSN 0145–9406.

L. Purcell, "Roping in Risk, 05/94", Bank System Technology, pp. 64–68.

Quinn, "Credit Card Issuers Keeping Closer Watch on How you Pay Bills", Apr. 25, 1988, Washington Post, Business Section, p. 67.

"Credit Risk Management Report", v. 3, No. 19, Philips Business Information, Inc., dialog file 636, Accession No. 02020764, Sep. 17, 1993.

Chandler, "Credit Scoring", Credit Union Executive, Dialog file 648, Jul. 1985 Now considered in full. NDR Jun. 26, 2002.

Grafton, "Analyzing Customers with Behavioral Modeling", 1996, Credit Control, v 17n6, pp. 27–31, dialog file 15, Accession No. 01265295.

Leonard et al., "Automating the credit decision process", Journal of Retail Banking, v. 16, n. 1, p. 39(6), Spring 1994, Dialog file 148, Accession No. 07816398.

Thomas J. Healy, "The new Science of Borrower Behaviour", Mortage Banking, v. 58, n. 5, p 26(8), Feb. 1998, dialog file 148, Accession No. 10389009.

Scott D. Aquais, "It's the economy, issuer!", Credit Card Management, V5n11, pp: 58–60, Feb. 1993, dialog file 15, Accession No. 00681693.

Keven T. Higgins, "Retention by the numbers, Credit Card Management," v5n11, pp: 52–56, Feb. 1993, dialog file 15, Accession No. 00681692.

* cited by examiner

| CLASS NUMBER | CLASS | SUBCLASS | OPERATORS |
|---|---|---|---|
| 1 | DATABASE DATA STRUCTURES 306 | — | DataBase 210 |
| | | | DataBaseLag 214 |
| | | | IndexRead 218 |
| 2 | ATOMIC TRANSFORMATIONS 308 | — | Atomic 222 |
| | | | Constant 226 |
| | | | Token 278 |
| 3 | ENTITY TRANSFORMATIONS 310 | SIMPLE TRANSFORMATIONS 322 | Continuous 230 |
| | | | Fuzz 234 |
| | | COMPLEX TRANSFORMATIONS 324 | ArraySparse 242 |
| | | | GeneralOperator 246 |
| 4 | TIME TRANSFORMATIONS 312 | INTEGRATION/SMOOTHING TRANSFORMATIONS 326 | AlphaSmoothing 250 |
| | | | AlphaBetaSmoothing 254 |
| | | LAG TRANSFORMATIONS 328 | Forecast 258 |
| | | | Histogram 262 |
| | | | Lags 266 |
| 5 | JOIN-TABLE OPERATORS 314 | — | JoinHistogram 270 |
| | | | JoinSummarize 274 |

METHOD AND APPARATUS FOR PATTERN GENERATION

RELATED PATENT APPLICATION

This is a Continuation application of prior application Ser. No. 08/863,443 filed on May 27, 1997, now U.S. Pat. No. 6,018,723 the disclosure of which is incorporated herein by reference.

The following patent application is incorporated herein by reference. Commonly assigned patent application entitled "IMPROVED FINANCIAL RISK PREDICTION SYSTEMS AND METHODS THEREFOR," invented by Catherine A. Basch, Belva J. Bruesewitz, Patrick L. Faith, and Kevin P. Siegel, filed on May 27, 1997, now U.S. Pat. No. 6,119,103.

The following patent application is incorporated herein by reference.

Commonly assigned patent application entitled "IMPROVED FINANCIAL RISK PREDICTION SYSTEMS AND METHODS THEREFOR," invented by Jean Bruesewics, Patrick L. Faith, and Kevin P. Siegel, filed on even date, now U.S. Pat. No. 08/863,666.

BACKGROUND OF THE INVENTION

1. Field of Invention

The present invention relates generally to methods and apparatus for use in financial data analysis. More particularly, the present invention relates to methods and apparatus for efficiently deriving characteristic variables from financial transaction data using precedence relationships such that the characteristic variables may be used by risk prediction models.

2. Background

As the use of bankcards is becoming more prevalent, issuers of bankcards are finding that their credit and fraud charge-offs, including bankruptcy losses, are increasing. When a bankcard account holder is forced to "default" on payments for transactions, e.g., financial transactions, performed using his or her bankcard, it is the issuers of the bankcards who are most often forced to absorb the associated losses. As such, to protect themselves financially, issuers of bankcards are developing so-called "risk prediction" models which they use to assess risks, e.g., bankruptcy risk, fraud risk and non-bankrupt risk, associated with a bankcard account holder. Risk prediction models for the detection of frauds are typically based upon the analysis of patterns exhibited in series of transactions performed by the bankcard holder in a single account.

On the other hand, models for evaluating bankruptcy and credit risks are typically based on historical payment data and account performance data. To elaborate, risk prediction models for the evaluation of bankruptcy and credit risk typically use historical account performance data associated with a bankcard account or, more generally, the holder of a bankcard account, to identify a pattern of payment and to correlate the pattern of payment to known patterns of payment. In other words, the payment pattern of the account holder is compared against payment patterns which are considered as being indicative of a relatively high risk of future financial problems, as for example bankruptcy or credit loss.

With respect to fraud detection systems, for example, transaction data, e.g., data in the format of a string of data containing a series of different data fields, typically is not used directly by the fraud detection models. In general, the transaction data, which includes such data as an account number, a transaction amount, a transaction time, and a merchant zip code, as well as various other data, must be transformed into characteristic variables which may be used as direct inputs to the risk prediction models. These characteristic variables include, for example, a variable which holds the risk associated with a transaction occurring in a particular geographic area, a time-weighted sum of the total number of consummated financial purchases, and a running sum of the total amount of consummated purchases.

It should be appreciated that the number of characteristic variables which may be used by fraud risk detection models is numerous, as well as dynamic, in that desired characteristic variables may change. By way of example, new characteristic variables may be created for use in risk prediction models as needed.

In conventional fraud risk detection models, characteristic variables are derived from transaction data using hard-coded computer programs written in a suitable language, as for example computer programs written in the C computer language. Hard-coded computer programs are used for their ability to handle high volume streams of data. The transaction data is provided as inputs to the hard-coded computer program which then generates characteristic variables. Due to the volume of characteristic variables which may potentially be used, as well as the size constraints associated with most computer programs, creating a computer program which is arranged to generate substantially any possible characteristic variable would be impractical, if not virtually impossible.

Requesting characteristic variables which are not already provided for in hard-coded computer programs, therefore, are not easily obtained. Hence, the use of hard-coded computer programs to generate characteristic variables often proves to be unsatisfactory, as required characteristic variables often change, for instance, as fraud detection models become more advanced.

Theoretically, although substantially any characteristic variable may be generated using hard-coded computer programs, when a new, previously unavailable characteristic variable is desired, the hard-coded computer programs must generally be rewritten and recompiled. Therefore, such an approach to generating characteristic variables is often complicated, and, hence, inefficient, as rewriting and recompiling code is not a trivial task. Further, it would be virtually impossible to anticipate which characteristic variables may eventually be needed. As such, writing a hard-coded computer program that is intended to produce only those characteristic values whose use is anticipated would be an extremely difficult task.

To address the flexibility problem, non-hardcoded computer programs or analytical systems may be used to generate characteristic variables. Once the characteristic variables are found, using the non-hardcoded approach, the mathematical descriptions of these characteristic variables are typically handed off to the production system programmers, who may then code the mathematical description into a transactions processing system using, e.g., C, C++, COBOL, or any other suitable programming language that can achieve the necessary transaction processing rates. However, such non-hardcoded computer programs or analytical systems also have disadvantages, e.g., they typically do not have the capability to handle high volume streams of data.

Although the preceding discussion has been made with reference primarily to fraud risk detection systems, similar issues exist in the design and implementation of bankruptcy prediction systems. As mentioned, the transaction data for prior art bankruptcy prediction systems differ from prior art fraud detection systems in that they typically represent historical payment data and account performance data. Nevertheless, the task of generating characteristic variables for prior art bankruptcy prediction systems using hardcoded computer programs and non-hardcoded approach also involve the aforementioned flexibility and/or data handling penalties.

An efficient method and apparatus for transforming raw transaction data into characteristic variables, without requiring the reconfiguration of significant portions of hard-coded computer programs, while enabling high volume streams of data to be handled, is therefore desired. In other words, what is needed is a method and apparatus which enables substantially any characteristic variable to be readily created from raw transaction data. It would also be desirable if such a method and apparatus were capable of processing high volumes of data in real-time.

SUMMARY OF THE INVENTION

The present invention relates to methods and apparatus for transforming scaleable transaction data into financial data features. In one aspect, a computer-implemented method transforms scaleable transaction data into a financial data feature for use in assessing credit risk. The financial data feature is extracted from the transaction data. The method involves obtaining the transaction data from a data source, and performing a set of operations on the transaction data to transform the transaction data into the financial data feature. The set of operations is selected only from a predefined set of classes of operations which are interrelated by a predefined order of precedence. Each operation in the set of operations is performed in an order based on the predefined order of precedence of a class associated with each operator.

In one embodiment, the set of predefined classes of operations includes at most five classes of operations which are a data structure class, an atomic transformation class, an entity transformation class, a time transformation class, and a joining operator class. In another embodiment, the financial data feature is configured to be used in a risk prediction model, and the method also involves providing the financial data feature to the risk prediction model. In such an embodiment, the method further involves implementing the risk prediction model with the financial data feature and assessing a risk of bankruptcy based on a result of the implementation of the risk prediction model.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The present invention will now be described in detail with reference to a few preferred embodiments thereof as illustrated in the accompanying drawings. In the following description, numerous specific details are set forth to provide a thorough understanding of the present invention. It will be obvious, however, to one skilled in the art, that the present invention may be practiced without some or all of these specific details. In other instances, well known structures and process steps have not been described in detail to not unnecessarily obscure the present invention.

Figure 1:
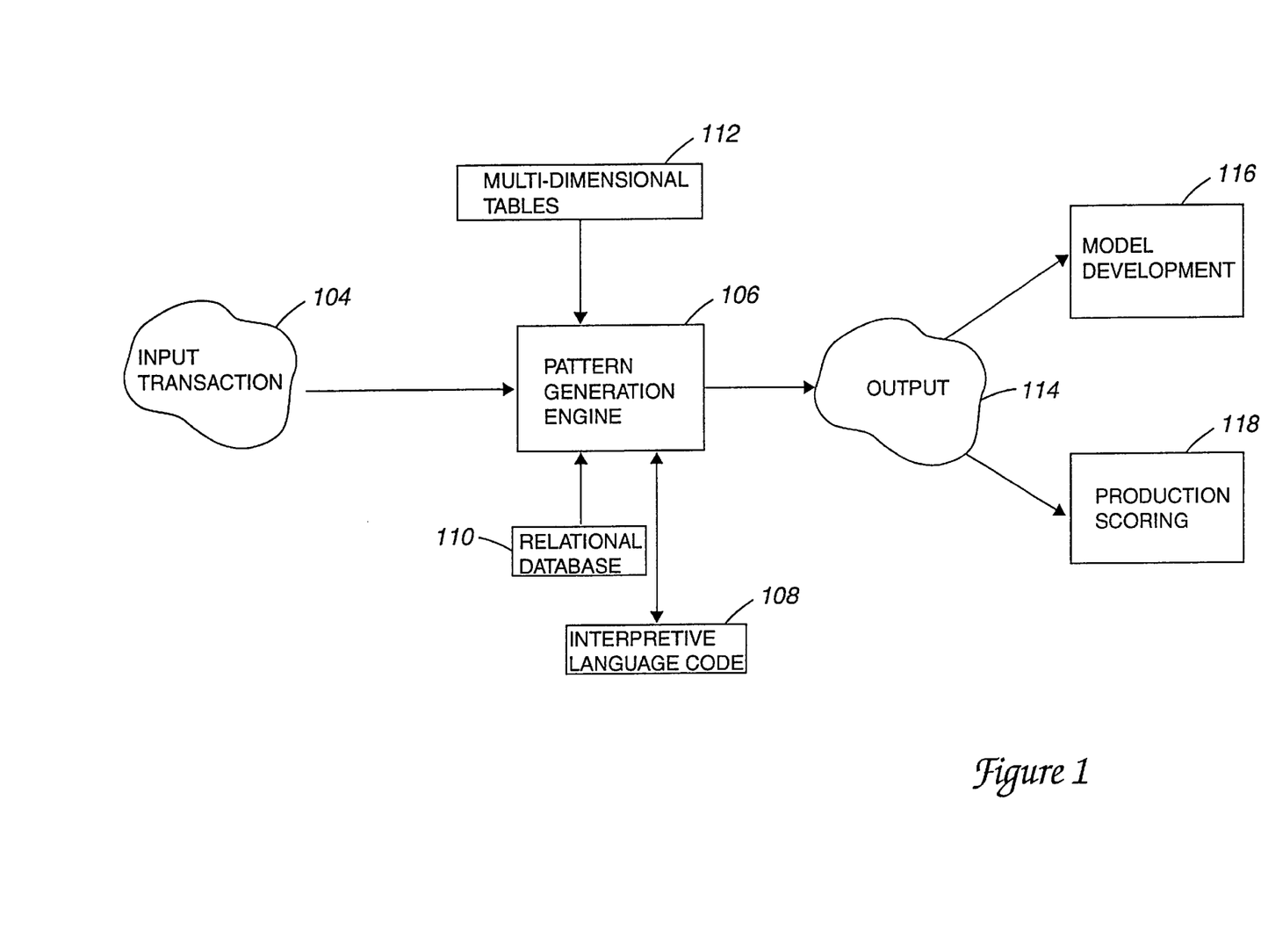
FIG. 1 is a diagrammatic representation of the flow of data through a pattern generation engine in accordance with an embodiment of the present invention.

FIG. 1 is a diagrammatic representation of the flow of scoreable transaction data through a pattern generation engine in accordance with an embodiment of the present invention. In general, a pattern generation engine is a software engine which may be used to transform scoreable transaction data into "pattern" data or the output from a series of characteristic variables, for use in a risk prediction model. In accordance with one particularly advantageous aspect of the present invention, scoreable transactions may include any event that may impact a credit holder's credit risk level. In other words, the scoreable transactions of the present invention include not only financial transaction data (e.g., authorizations and settlements for purchases of goods or services on credit or cash withdrawal on credit) but also public record data, customer payment data, check clearing, and the like. In the described embodiment, a pattern generation engine is used to transform scoreable transaction data into characteristic variables, or data features, which are used in either or both a model development process or an associated transaction scoring process, which will be described below. Such a pattern generation engine is further arranged to analyze high-volume streams of data in real-time.

In accordance with one aspect of the present invention, the operators are efficiently organized for the specific purpose of providing flexible variable characterization and high speed operation. The operators that do not directly contribute to the purpose of characteristic variable generation are advantageously eliminated, thereby enabling high speed processing to occur. The operators are also organized to enable a large combination of characteristic variables to be derived simply by reorganizing the order of the operators.

An input transaction 104, which is generally a scoreable transaction performed using a bankcard, e.g., credit card, is provided as an input to a pattern generation engine 106. The customer who has possession of the bankcard, i.e., the account holder, generates input transaction 104 when he or she performs a transaction using the bankcard. Typical transactions include making purchases using the bankcard and obtaining cash advances using the bankcard. It should be appreciated that transactions may be widely varied, and may not necessarily reflect only transactions performed using a bankcard. By way of example, transactions may also include processing customer account information to determine whether a customer qualifies for a personal loan, as well as processing customer account information to determine if a check written by the customer is likely to be rejected.

Input transaction 104 may be characterized by a high speed data stream which includes, but is not limited to, data fields which contain information relating to a transaction type, data fields which contain information relating to the parties involved in the transaction, and data fields which contain various other information related to the transaction, e.g., the cost of a transaction. In general, input transaction 104 is stored in a data source (not shown) which may typically either be a data file or a database, as for example an account database or a customer database. Such a data source may be maintained by the financial institution which issued the bankcard used to perform input transaction 104.

Once input transaction 104 is obtained, input transaction 104 is provided as an input to a pattern generation engine 106. Pattern generation engine 106 is essentially a software analyzer which may be used to generate substantially any desirable pattern, e.g., financial characteristic. In the described embodiment, the desirable patterns are generated using a fixed set of operators composed using an interpretive language code.

The operation of pattern generation engine 106 involves interpretive language code 108, a relational database 110, and multi-dimensional tables 112 which are all essentially a part of pattern generation engine 106. Interpretive language code 108 includes the fixed set of operators, as mentioned above, which are applied to input transaction 104 to create desired characteristics. Such desired characteristics may include, but are not limited to, for example, the number of times a particular type of transaction was performed over a fixed period of time and the cost accrued with transactions processed during a particular period of time. It should be appreciated that, as will be described below with respect to FIG. 2, substantially any characteristic which may be of interest to a financial institution may be derived using the set of operators associated with interpretive language code 108, and, therefore, pattern generation engine 106.

As substantially any relevant characteristic may be derived using the set of operators associated with interpretive language code 108, it should be appreciated that the use of interpretive language code 108 enables new characteristics to be generated by simply combining the operators, and changing the values of operands that are operated upon by the operators. In contrast to the inefficient, conventional need to rewrite a hard-coded higher-level computer program to generate new characteristics, the ability to recombine operators at an intermediate programming level, e.g., using a pseudo-language that may be interpreted to generate new characteristics, does not require any changes to be made to a hard-coded, higher-level computer program. Further, the use of an intermediate programming level also enables parameters associated with operators to be readily modified, essentially, "on-the-fly," or in real-time. As such, any desired characteristic variable may be obtained without requiring changes to be made to a higher-level computer program.

In the described embodiment, interpretive language code 108 is created using a high-level programming language. That is, the operators associated with interpretive language code 108 may be coded using any suitable programming language. By way of example, the operators may be coded using the C programming language.

Relational database 110 is arranged to store scoreable transaction information. By way of example, lags, or time series, of transaction data may be stored in relational database 110. In one embodiment, relational database 110 may be either an account database or a customer database. When the creation of a desired characteristic requires the use of a series of values associated with previous transactions performed on a particular account, the previous values may generally be obtained from relational database 110.

Multi-dimensional tables 112 are generally n-dimensional matrices which include parameters that have multiple "keys," which include, but are not limited to, a merchant identifier, a location code, and a zip code. Multi-dimensional tables 112 may contain parameters, as for example risk values, which are not stored in a database, such that the parameters are readily accessible to pattern generation engine 106.

Once input transaction 104, which, as previously mentioned, is a scoreable transaction, has been processed by pattern generation engine 106, the "output" 114, i.e., the characteristic variable, is forwarded either to a model development process 116 or to a production scoring process 118 that is associated with model development process 116. Although model development process 116 may be used to develop any suitable model which uses characteristic variables related to financial transactions, e.g., financial data features, model development process 116 is generally used to develop a risk prediction model. A risk prediction model may be used to determine potential risks associated with an account or an account holder. By way of example, a risk prediction model may be used to assess the likelihood that an account holder will be forced to declare bankruptcy based on the information provided in a characteristic variable. Alternatively, a risk prediction model may also be used to assess the probability that a particular scoreable transaction is fraudulent. A risk prediction model may further be used to evaluate the performance of a portfolio, to set limits, and to reduce exposure, as will be appreciated by those skilled in the art.

Production scoring process 118 is generally used as an input to the scoring logic of a model, e.g., a risk prediction model, developed using model development process 116. In other words, production scoring process 118 may be used to associate a score with a particular characteristic value such that a risk may be assessed.

Figure 2:
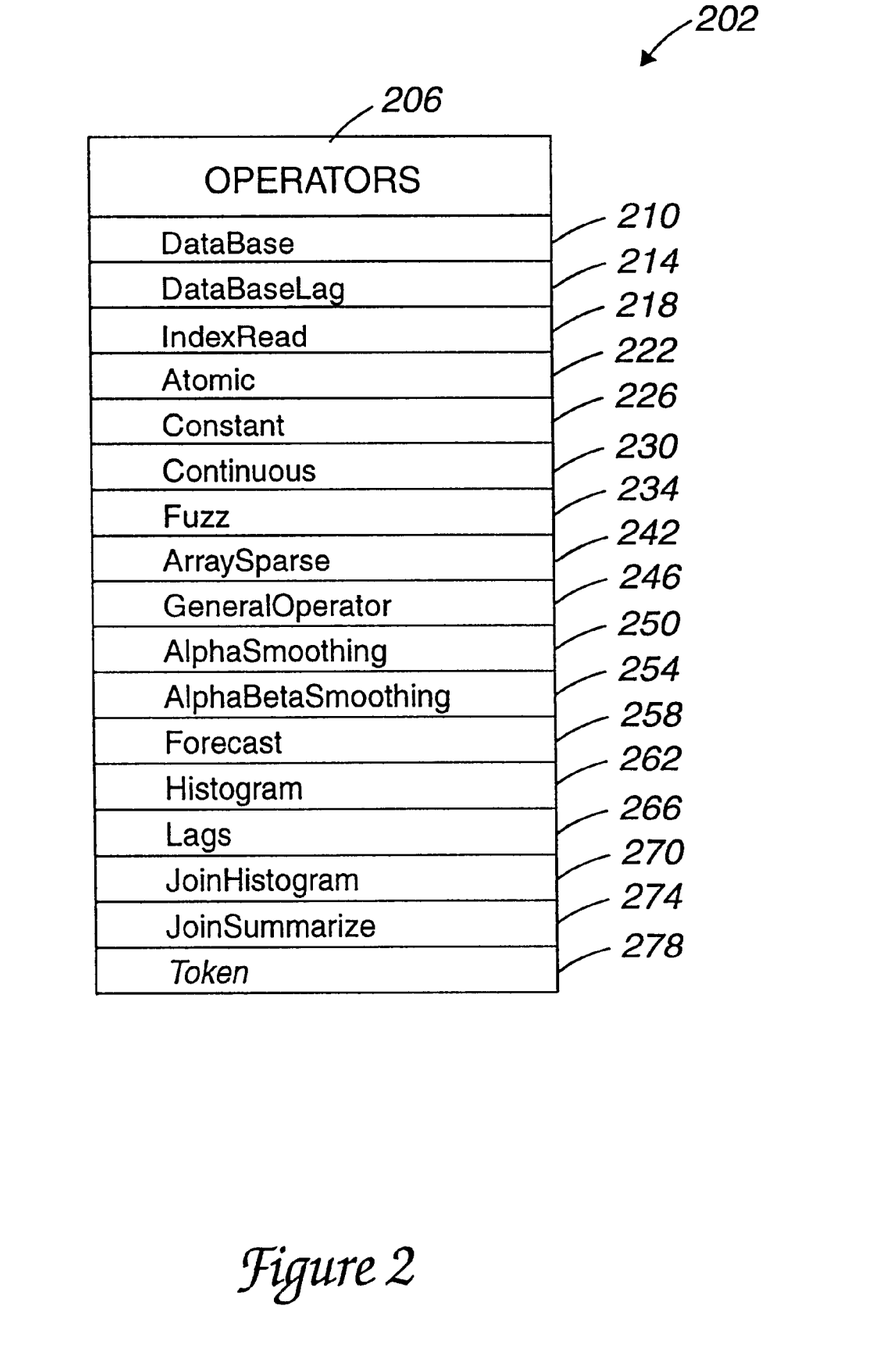
FIG. 2 is a diagrammatic representation of a list of operators used by a pattern generation engine in accordance with an embodiment of the present invention.

Referring next to FIG. 2, the operators which are used by the pattern generation engine, as discussed above with respect to FIG. 1, will be described in accordance with an embodiment of the present invention. A table 202 lists a set of operators 206 which, when used in various combinations, serve to transform input data into substantially any desired output. In the described embodiment, the minimum number of operators 206 that are necessary to efficiently transform input data into substantially any desired characteristic, e.g., characteristic variable, indicator, feature, or output, is sixteen. It should be appreciated, however, that although the minimum number of operators 206 is sixteen in the this embodiment, an optional seventeenth operator is often used in conjunction with the sixteen "compulsory" operators, as will be described below.

Operators 206 include a "DataBase" operator 210. DataBase operator 210 is generally used to identify a particular location within a specific database that is used or will be used to store a given variable. For example, DataBase operator 210 may refer to a storage location within relational database 110. While DataBase operator 210 can be invoked using any suitable arguments, in one embodiment, arguments, or operands, passed to DataBase operator 210 typically include the name of a database, the name of the variable that is to be stored in the database, the location within the database where the variable is to be stored, and the variable type.

Operators 206 also include a "DataBaseLag" operator 214. The general purpose of DataBaseLag operator 214 is to specify a database, as well as locations within the database, in which lags, e.g., time series, of variables may be stored. In one embodiment, arguments used by DataBaseLag operator 214 include the name of a database, the name of a variable to be stored in the database, and the locations within the database where the lags of the variable is to be stored. Arguments passed into DataBaseLag operator 214 may also include, but are not limited to, the number of lags to be stored, the time period on which the variable is to be lagged, and the variable type.

An "IndexRead" operator 218 is arranged to read elements from a table, as for example an index table, which may be included in any suitable multi-dimensional data source, i.e., a sparse matrix. It should be appreciated that IndexRead operator 218 generally is not arranged to be used with relational databases. IndexRead operator 218 may be used to read an ASCII character file that contains desired information, e.g., the mean and the standard deviation for a particular risk characteristic, in an index table and to store the information in a table in random access memory (RAM). Storing data in a RAM table generally enables the data to be readily accessed. IndexRead operator 218 may be passed arguments such as the name of the file which contains the index table, the name of the output data table in RAM, and the number of arguments, or parameters, to be read from the index table.

An "Atomic" operator 222 may be used to read in a field from an input data source. Although the input data source may be either a database or a file, in the described embodiment, the input data source is generally a file, such as for example an ASCII file, or a line read from a database. Arguments which are used to invoke Atomic operator 222 include, in the described embodiment, an identifier associated with an input data source, a name for the data element that is to be read, and the byte position for the start location and the end location of the field for the data element that is to be read from the input data source. It should be appreciated that various other arguments may be used in addition to, or in lieu of, the above-mentioned arguments. By way of example, a data type, e.g., character, integer, or float, that is associated with the data element may also be included as an argument.

The set of operators 206 also includes a "Constant" operator 226 that is used to declare the value of constants that may be used by other operators 206. Constant operator 226 may take as arguments a name for the constant that is being declared, a type for the constant, and a value for the constant. In general, the declared constants are either integers, strings, or floats.

A "Continuous" operator 230 is arranged to scale data to a sub-domain of a given function. In other words, Continuous operator 230 is used to map data into a new range using any suitable function, such as, by way of example, a logarithmic function or an exponential finction. In some embodiments, it is desirable to map data such that the actual distribution of data may be more readily interpreted, i.e., a pattern in the data may be easier to identify. Operands used in a call to Continuous operator 230 generally include the name of a value or set of values which is to be operated upon, a representation of the function that is to be used to map values, and any constants associated with the function. It should be appreciated that the function may be identified by a name. Alternatively, the function may be explicitly included as an argument in Continuous operator 230. Arguments in a call to Continuous operator 230 typically include the name of a variable or variables which will hold the mapped results of the call to Continuous operator 230.

A "Fuzz" operator 234 is essentially a fuzzy logic operator derived from fuzzy set theory, and serves to map data in an input domain to a membership value through the use of a membership function, which is well known to those of skill in the computer science arts. In general, membership functions are used to relate data between different classes. By way of example, data relating to a transaction performed on a particular day may be a "member" of the class of data that pertains to transactions performed during a week which includes the particular day. Locating a membership value associated with an input variable enables that value to be associated with different membership classes.

Although arguments to Fuzz operator 234 may be widely varied, in the described embodiment, arguments to Fuzz operator 234 may include an input variable, the name of a suitable membership function, any parameters required by the membership function, and the name of the output variable which holds the membership value. Examples of membership functions include, but are not limited to, Gaussian curve membership functions, trapezoidal membership functions, and generalized bell-curve membership functions.

An "ArraySparse" operator 242 is arranged to search sparse, or relatively empty, arrays for particular fields. Sparse arrays may include, but are not limited to, arrays of field codes that were derived using IndexRead operator 218. ArraySparse operator 242 may take as arguments, for example a risk index variable, an input index variable, or a name of an output variable. A risk index variable is used to identify an array which contains index variables and risk values, or values which signify the risk associated with a given variable. An input index variable is typically a value which is used to locate the desired field in the array identified by the risk index variable. A name of an output variable specifies the risk values associated with successfully matched input index variables.

Operators 206 also include a "GeneralOperator" operator 246 that is arranged to perform arithmetic operations and comparison operations. It should be appreciated that arithmetic operations may be widely varied. However, in the described embodiment, arithmetic operations include, but are not limited to, such "simple" arithmetic operations as addition, subtraction, multiplication, division, and exponentiation. Similarly, comparison operations may also be widely varied. Comparison operations performed between two or more entities may involve such comparison operators as "equal to" operators, "not equal to" operators, "greater than" operators, and "less than" operators, as will be appreciated by those skilled in the art. Such comparison operators may also include, when comparisons are performed between logical arguments, "and," "or," and "not" operators.

In the described embodiment, arguments to GeneralOperator operator 246 include variables on which arithmetic or comparison operations are to be performed, a specified arithmetic or comparison operation, and a variable arranged to hold the result of the arithmetic or comparison operation. For embodiments in which GeneralOperator 246 is used to calculate a running sum, the variable which holds the result of the arithmetic operation may be the same as one of the input variables.

An "AlphaSmoothing" operator 250 is used to compute a weighted sum, e.g., a time-weighted sum, for a set of data, or, more specifically, transaction data. In one embodiment, the weighted sum is an exponentially smoothed sum. Arguments to AlphaSmoothing operator 250 include, but are not limited to, the name of the variable which holds the exponentially smoothed value, the name of the "raw" variable which is to be smoothed, and constants, as for example a decay constant associated with the exponentially smoothed sum. It should be appreciated that the variable to be smoothed and the variable which holds the exponentially smoothed value may be the same variable.

An "AlphaBetaSmoothing" operator 254 used to compute a weighted average, as for example a time-weighted average. As such, AlphaBetaSmoothing operator 254 generally takes the same arguments as AlphaSmoothing operator 250, namely the name of the variable which contains the smoothed value, the name of the variable that is to be smoothed, and constants. AlphaBetaSmoothing operator 254 differs from AlphaSmoothing operator 250 in that AlphaBetaSmoothing operator 254 typically involves a superposition of exponential functions, whereas AlphaSmoothing operator 250 is typically characterized by a single exponential function. Further, AlphaBetaSmoothing operator 254 computes weighted averages, while AlphaSmoothing operator 250 computes weighted sums.

A "Forecast" operator 258 is used to fit and forecast a time series to input data. By way of example, Forecast operator 258 may be used to predict activity for a current or future month based upon the activity in previous months. Arguments which are generally used by Forecast operator 258 include variables to be used in forecast modeling, e.g., variables which relate to activity in previous months. Other arguments may include variables which hold the forecasted, or predicted, result as well as variables which hold confidence limits on the forecasted result, as for example upper and lower confidence limits.

A "Histogram" operator 262 is used to generate statistics based on input data which, in the described embodiment, represents a series of transactions. In one embodiment, Histogram operator 262 is used to analyze a set of values to identify the value, or values, that most frequently occur for a given variable associated with an account. Typical arguments that are passed to Histogram operator 262 usually include an input variable to be histogramed, the number of lags of the input variable that are to be used in the generation of a histogram, a time constraint to be used in the calculation of the histogram, and an output variable arranged to hold the results of the histogram. It should be appreciated that if more than one output value is desired, e.g., the two most commonly occurring values are desired, then the number of output variables may be increased accordingly.

A "Lags" operator 266 is arranged to summarize a series of values. In other words, Lags operator 266 may be used to summarize a specified number of lagged values for a variable. Summarizing an event typically entails obtaining a value which characterizes a particular variable. Such characteristic values include, but are not limited to, the maximum value of a variable, the minimum value of a variable, the mean value of a variable, and the standard deviation associated with a variable.

Arguments to Lags operator 266 typically include an input variable which is to be characterized, the number of previous values of the input variable that are to be used to summarize the variable, the type of characteristic value desired, and a variable to hold the returned characteristic value. It should be appreciated that in some embodiments Lags operator 266 may be arranged to obtain and return more than one characteristic value which summarizes a variable.

Operators 206 further include a "JoinHistogram" operator 270 which, in the described embodiment, may be used to generate statistics relating to a variable over different accounts. That is, JoinHistogram operator 270 analyzes the most recent values for an input variable to be histogramed. Whereas the set of values analyzed using Histogram operator 262 as previously described is obtained from a single account, the set of values analyzed using Histogram operator 270 are obtained from different accounts. It should be appreciated that, in general, arguments passed into JoinHistogram operator 270 are the same as arguments passed into Histogram operator 270, e.g., an input variable and a number of lags.

A "JoinSummarize" operator 278 is related to Lags operator 266 in that JoinSummarize operator 278 summarizes a series of values associated with a variable. However, whereas Lags operator 266 summarizes values associated with a single account, JoinSummarize operator 278 summarizes values associated with separate, but common accounts, e.g., different accounts belonging to a single customer.

JoinSummarize operator 278 and Lags operator 266 are related; it follows that arguments passed into JoinSummarize operator 278 are generally the same as arguments passed into Lags operator 266. However, options associated with different arguments may be varied between Lags operator 266 and JoinSummarize operator 278. By way of example, options for a characteristic type argument, for both Lags operator 266 and JoinSummarize operator 278, may include, as previously mentioned, the maximum value of a variable, the minimum value of a variable, the mean value of a variable, and the standard deviation associated with a variable. As JoinSummarize operator 278 is associated with more than one account, characteristic types for JoinSummarize operator 278 may further include characteristics such as the number of accounts which have non-zero values for a variable.

As discussed above, in the described embodiment, the preferred minimum number of operators 206 that are used to efficiently transform input transaction data into substantially any desired output is sixteen. However, the sixteen above-described operators are intended for use on input streams of fixed lengths, where certain data is located in fixed positions. In other words, the sixteen operators are intended to be applied to systems in which transaction data is presented in streams of a standard length. Within these streams, strings which pertain to certain types of data are located in known positions, as will be appreciated by those skilled in the art.

For embodiments in which either or both the stream lengths and the location of data within a stream may vary, an optional seventeenth operator may be used in conjunction with the sixteen operators described above. In the described embodiment, the optional seventeenth operator is a "Token" operator 278. Token operator 278 may be arranged to identify the record lengths of variables and the location of variables within a stream. The arguments passed to Token operator 278 generally include the name of an input variable, as well as a "token," or identifier for the input variable. The token may be a particular character which, when located in a stream, signifies that the string which pertains to the input variable follows. It should be appreciated that for embodiments in which the record length of the input variable is unknown, an additional token value which identifies the end of a string, may be included as an argument to Token operator 278.

It should be appreciated that in one embodiment, the use of a minimum of five operators may be sufficient to generate substantially all desired characteristic variables. These five operators are DataBaseLog operator 214, IndexRead operator 218, Atomic operator 222, ArraySparse operator 242, and Lags operator 266. An additional operator, e.g., JoinSummarize operator 274, is generally required to create patterns, which are an aggregation of multiple accounts.

Figure 3:
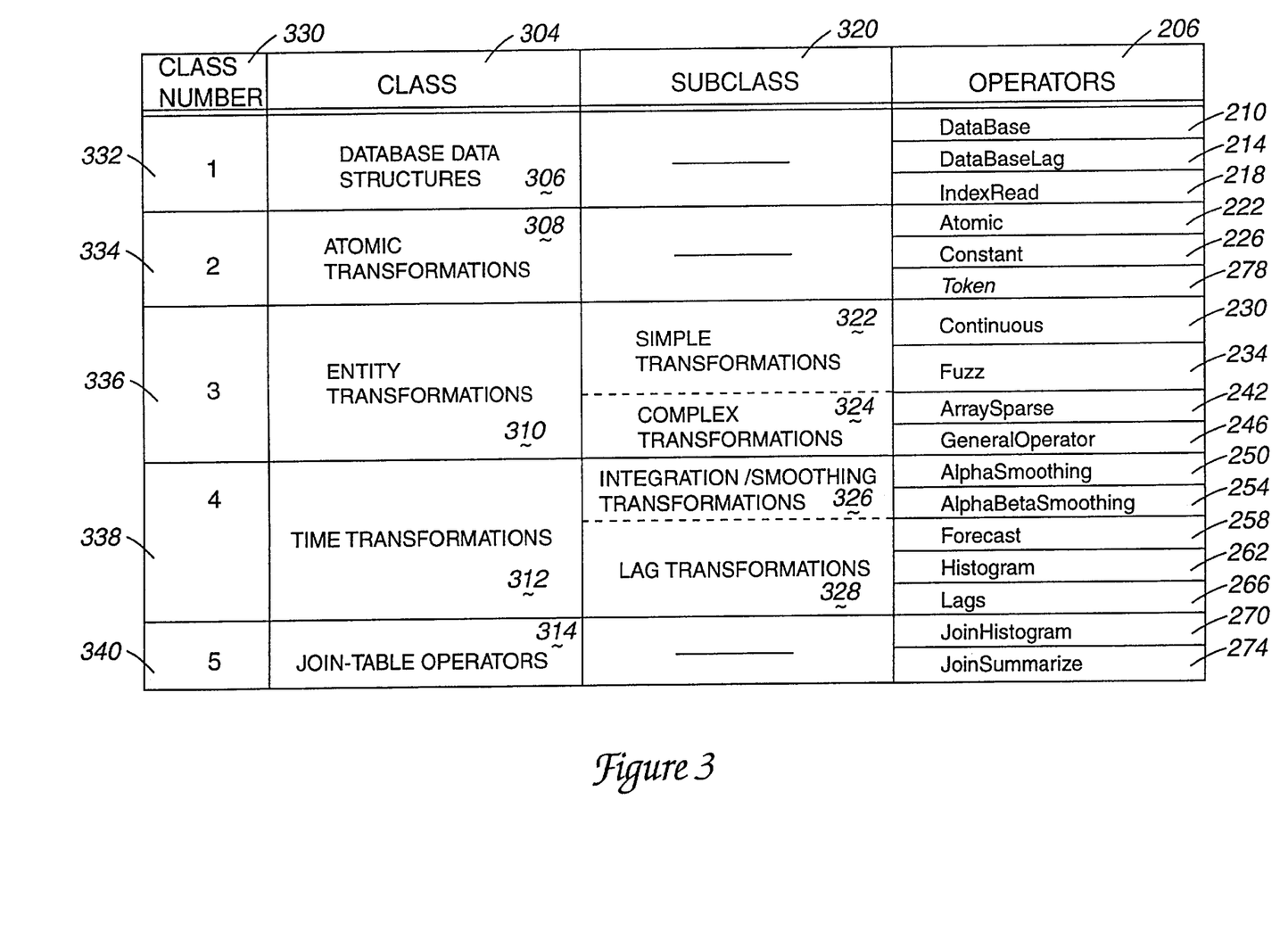
FIG. 3 is a diagrammatic representation of the classes that are recognized by a pattern generation engine in accordance with an embodiment of the present invention.

FIG. 3 is a diagrammatic representation of the classes that are recognized by a pattern generation engine in accordance with an embodiment of the present invention. In general, the classes represent divisions of the operators described above with respect to FIG. 2. The classes are divided such that by selecting operators from the classes, and applying the operators following a specified "order," which will be described below with reference to FIG. 4, substantially any desired transactional output may be obtained. In other words, combining operators selected from the classes by following a precedence relationship associated with the classes enables generation of substantially any desired output that is suitable for use with a risk prediction model.

In one currently preferred embodiment, a total of five classes 304 are provided, including a "Database Data Structures" class 306, an "Atomic Transformations" class 308, an "Entity Transformations" class 310, a "Time Transformations" class 312, and a "Join-Table Operators" class 314. Some of classes 304 may be divided into subclasses 320. By way of example, Entity Transformations class 310 may be divided into a "Simple Transformations" subclass 322 and a "Complex Transformations" subclass 324, while Time Transformations class 312 may be divided into an "Integration/Smoothing Transformations" subclass 326 and a "Lag Transformations" subclass 328.

Class numbers 330 may be associated with classes 304. By way of example, Database Data Structures class 306 is associated with class number "1" 332, while Atomic Transformations class 308 is associated with class number "2" 334. Further, Entity Transformations class 310 is associated with class number "3" 336, Time Transformations class 312 is associated with class number "4" 338, and Join-Table Operators class 314 is associated with class number "5" 340. It should be appreciated that, herein and below, classes 304 and class numbers 330 associated with classes 304 will be used interchangeably.

Database Data Structures class 306, in general, includes a sub-set of operators 206 which relate to variables that may be stored in databases. The sub-set of operators 206 are DataBase operator 210, DataBaseLag operator 214, and IndexRead operator 218. Atomic Transformations class 308 generally includes operators 206 which pertain to obtaining data from fields contained in ASCII files, as for example Formatted Transaction Log (FTL) files. Operators 206 contained within Atomic Transformations class 308 may be used to segment out desired bytes of information from ASCII files. As such, operators 206 contained within Atomic Transformations class 308 are Atomic operator 222, Constant operator 226, and optional Token operator 278. It should be appreciated that operators 206 in Database Data Structures class 306 may be used to operate on permanent variables as well as transient and temporary variables.

Entity Transformations class 310, as previously mentioned, may be divided into Simple Transformations subclass 322 and Complex Transformations subclass 324. In general, Entity Transformations class 310 involves a sub-set of operators 206 which may be used to transform variables and tables from one format to another. Simple Transformations subclass 322 includes Continuous operator 230, and Fuzz operator 234, all of which are typically arranged to transform a simple variable in a static manner. Alternatively, Complex Transformations subclass 324 includes Array-Sparse operator 242 and GeneralOperator operator 246, which are generally use transform. In general, operators 206 which are included in Entity Transformations class 310 may only operate on transient or temporary values.

Time Transformations class 312, in the described embodiment, includes a subset of operators 206 that are used to operate on records associated with a database. The records, in general, represent a time series of transaction data. An "Integrations/Smoothing Transformations" subclass 326 and a "Lag Transformations" subclass 328 are subclasses 320 of Time Transformations class 312. Integration/Smoothing Transformations subclass 326 includes operators 206 which may be used to operate on database event records in order to calculate, for example, averages for transactions without explicitly storing all previous transactions. AlphaSmoothing operator 250 and AlphaBetaSmoothing operator 254, which were previously discussed, are associated with Integration/Smoothing Transformations subclass 326. Operators 206 associated with Lag Transformations subclass 328 are arranged to utilize substantially all available data, e.g., event records, that involves a particular type of transaction over a given time period such that a trend in the data may be determined. Forecast operator 258, Histogram operator 262, and Lags operator 266 are generally associated with Lag Transformations subclass 328. It should be appreciated that operators 206 which are included in Time Transformations class 312 are arranged only to operate on transient or temporary values.

In general, operators 206 which are included in Join-Table Operators class 314 are used to join, or otherwise link, variables across different accounts which have a common aspect. This common aspect may be, for example, a common owner of the different accounts. Essentially, operators 206 associated with Join-Table Operators class 314 are used to aggregate variables across different accounts to create an overall representation of the variables over time. In the described embodiment, Join-Table Operators class 314 includes JoinHistogram operator 270 and JoinSummarize operator 274. Operators 206 associated with Join-Table Operators class 314 are arranged such that they may operate only on transient or temporary values.

Figure 4:
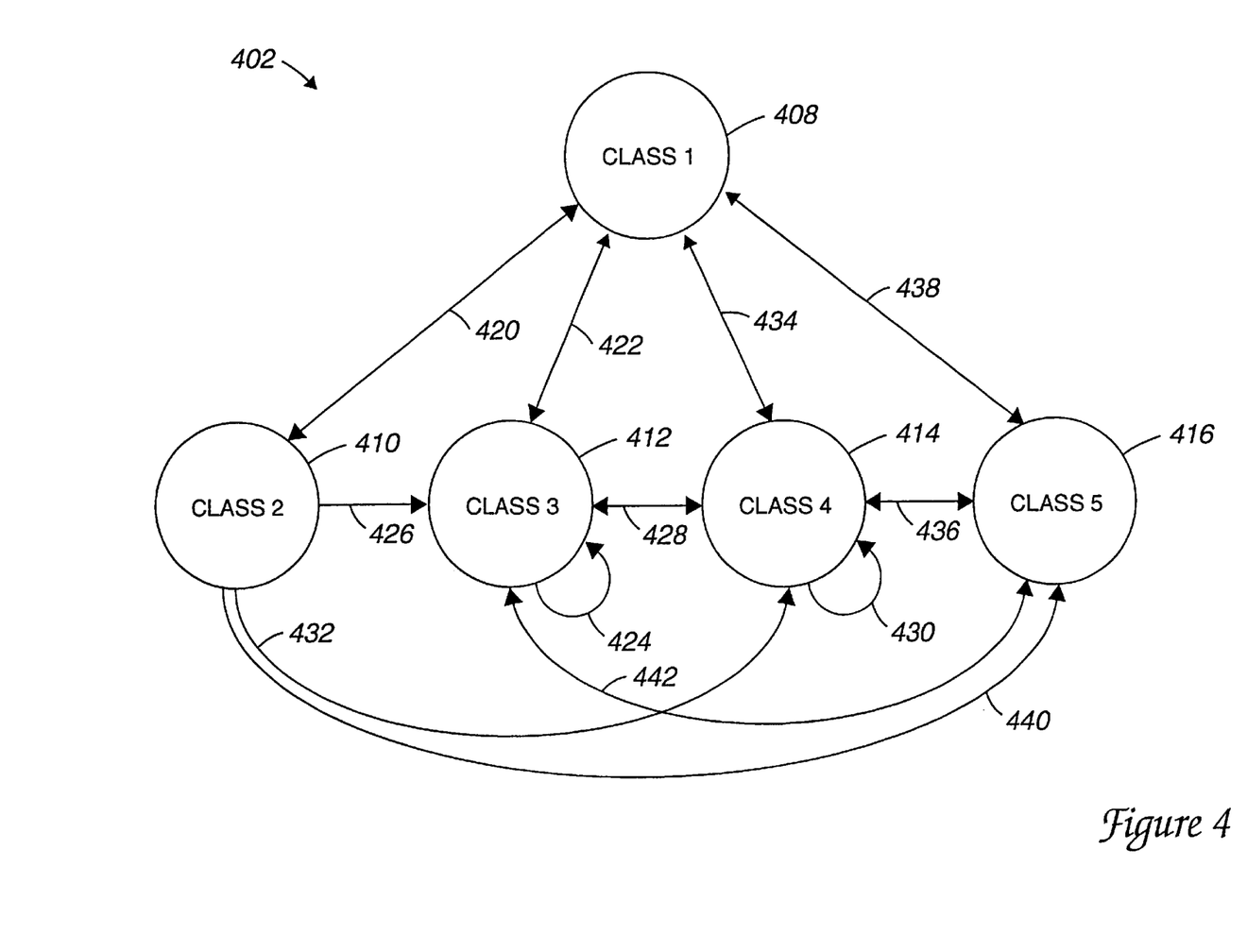
FIG. 4 is a diagrammatic representation of the precedence relationships between classes in accordance with an embodiment of the present invention.

With reference to FIG. 4, the precedence relationships between classes, i.e., the classes discussed above with respect to FIG. 3, will be described in accordance with an embodiment of the present invention. A precedence relationship specifies the order in which operations in different classes may be executed. That is, a precedence relationship designates which operators may provide input to other operators.

It should be appreciated that all operator pass values, e.g., permanent or temporary values. Such values may be scalar, vector, or matrix values. As such, precedence relationships, which are indicated in FIG. 4 by arrows, represent the precedence of operator operations and, in addition, describe the flow of data values between operators. In one embodiment, the data values are integers, floats, and strings.

Precedence state diagram 402 includes representations of Class "1" 408, i.e., the Database Data Structures class, Class "2" 410, i.e., the Atomic Transformations class, Class "3" 412, i.e., the Entity Transformations class, Class "4" 414, i.e., the Time Transformations class, and Class "5" 416, i.e., the Join-Table Operators class. The precedence relationship between classes is generally represented by arrows, as for example arrow 420 between Class "1" 408 and Class "2" 410. As previously mentioned, substantially any desired characteristic may be obtained from transaction data by combining operators using the precedence relationship outlined by precedence state diagram 402.

As indicated by arrow 420, an operation in Class "1" 408 may precede an operation in Class "2" 410. For example, a value, e.g., a value in ASCII format, obtained from a database may be transformed into a numerical value by an operation associated with Class "2" 410. In other words, a value obtained from a database may be used as an argument in an operation associated with Class "2" 410. Arrow 420 also indicates that an operation in Class "2" 410 may precede an operation in Class "1" 408. As such, another relationship specified by arrow 420 indicates, in one embodiment, that a value generated from an atomic transformation may be saved into a database.

An arrow 422 specifies a precedence relationship between Class "1" 408 and Class "3" 412. The relationship defined by arrow 422 indicates that operations associated with Class "1" 408 may directly precede operations associated with Class "3" 412, and that operations associated with Class "3" 412 may precede operations associated with Class "1" 408. Arrow 422 implies that data may be retrieved from a database and be operated upon by an entity transformation. By way of example, an atomic value retrieved from a database may be mapped into a desirable format associated with a risk prediction model. Arrow 422 also shows that data operated upon by an operation associated with Class "3" 412 may generally be followed by an operation associated with Class "1" 408, e.g., data transformed by an operation associated with Class "3" 412 may be stored directly into a database.

An arrow 424 indicates that Class "3" 424 is re-entrant upon itself. In other words, an operation in Class "3" 424 may precede another operation in Class "3" 424. By way of example, the ArraySparse operator may directly precede the Continuous operator when the ArraySparse operator is used to find a risk value which is then used as a scaling constant by the Continuous operator.

An arrow 426 implies that operators in Class "2" 410 may directly precede operators in Class "3" 412. In one embodiment, the Atomic operator that is a part of Class "2" 410 may be used to read a field of data from a file which is provided as an input argument to an operator that is a part of Class "3" 412, e.g., the ArraySparse operator.

The precedence relationship between Class "3" 412 and Class "4" 414 is defined by an arrow 428 which indicates that while operators that are included in Class "3" 412 may precede operators that are included in Class "4" 414, the operators that are included in Class "4" 414 may also precede operators that are included in Class "3" 412. In other words, entity transformations and time transformations may occur in any order. An example of an operation in Class "3" 412 preceding an operation in Class "4" 414 involves using the Continuous operator to scale data which is then provided as an argument to the AlphaSmoothing operator such that the smoothed value of the scaled data is obtained. Alternatively, an example of an operation in Class "4" 414 preceding an operation in Class "3" 412 may involve invoking the ArraySparse operator on results obtained using the Histogram operator to find a field in an array which matches the results obtained using the Histogram operator.

As was the case for Class "3" 412, Class "4" 414, as shown by an arrow 430, is also re-entrant into itself. Hence, one operator in Class "4" 414 may precede another operator in Class "4" 414, e.g., the Lags operator may be used to obtain a range of values which are used by the Histogram operator.

While operators in Class "4" 414 typically do not directly precede operators in Class "2" 410, in the described embodiment, operators in Class "2" 410 may directly precede operators in Class "4" 414, as indicated by an arrow 432. This implies that results obtained using atomic transformations may be used as operands for a time transformation. For example, the value of a constant variable, e.g., a confidence limit on a forecast, defined using the Constant operator may be provided as an argument to the Forecast operator.

An arrow 434 specifies a precedence relationship between Class "1" 408 and Class "4" 414. The precedence relationship as defined by arrow 434 indicates that operations associated with Class "1" 408 may directly precede operations associated with Class "4" 414, and, conversely, operations associated with Class "4" 414 may directly precede operations associated with Class "1" 408. Arrow 434 implies that data may be retrieved from a database and be operated upon by a time transformation. By way of example, an atomic value retrieved from a database may be mapped into and used in an operation such as a forecast. That is, a forecast may be performed using data retrieved from a database. Arrow 434 also implies that data operated on by an operation associated with Class "4" 414 may immediately be operated on using a database data structure operation, i.e., an operation associated with Class "1" 408.

Class "4" 414 is related to Class "5" 416 as shown by an arrow 436. Specifically, as indicated by arrow 436, the precedence between Class "4" 414 and Class "5" 416 is such that operators in either class may directly precede operators in the other class. For instance, the Histogram operator that is a part of Class "4" 414 may either directly precede or directly follow the JoinHistogram operator that is a part of Class "5" 416.

The precedence relationship indicated by an arrow 438 implies that operators associated with Class "1" 408 may precede operators associated with Class "5" 416. In other words, arrow 438 indicates that data obtained from a database may be operated on directly by an operator associated with Class "5" 416, i.e., either the JoinHistogram operator or the JoinSummarize operator. The precedence relationship shown by arrow 438 also implies that operators associated with Class "5" 416 may precede operators associated with Class "1" 408.

The precedence relationship between Class "2" 410 and Class "5" 416 is shown by an arrow 440. Operators associated with Class "2" 410 may directly precede, or be used as an argument to, operators associated with Class "5" 416, i.e., an atomic transformation may directly precede a jointable operator. By way of example, a constant value created using the Constant operator may be used as an argument, e.g., the time over which a variable is to be summarized, that is passed into the JoinSummarize operator.

The precedence relationship between Class "3" 412 and Class "5" 416 is indicated by an arrow 442 which shows that operators in Class "3" 412 may precede operators in Class "5" 416, and that, conversely, operators in Class "5" 416 may precede operators in Class "3" 412. For example, the GeneralOperator operator associated with Class "3" 412 may be executed to transform a variable which may then be used as an argument to the JoinSummarize operator associated with Class "5" 416. Alternatively, results from the execution of the JoinSummarize operator may be operated upon by the GeneralOperator operator.

To better illustrate the precedence relationship between classes, a basic example of a data analysis performed following precedence state diagram 402 will be described in accordance with one embodiment of the present invention. It should be appreciated that this basic example is intended to illustrate, generally, how operators and classes may be interrelated. As such, specific details, such as the actual syntax of arguments passed to the operators, will not be described.

For example, in assessing the bankruptcy risk of a particular account holder, a financial institution may wish to monitor particular types of transactions, i.e., scoreable transactions, and the frequency of the different types of transactions. For example, if the volume and monetary amount of cash-withdrawal transactions increases dramatically over the course of a specified period of time, such activity may be associated with a relatively high risk of bankruptcy. As such, a financial institution may wish to monitor the number of cash-withdrawal transactions that an account holder has made using his or her bankcard over a specified period of time.

In order to monitor the cash-withdrawal transactions executed on an account by a customer within a specified period of time, an operator that is associated with Class "1" 408, i.e., the database data structures class, is invoked. In the described embodiment, the DataBaseLag operator is invoked. As previously described, the DataBaseLag operator is generally used to identify locations within a database in which lags of variables may be stored. Arguments passed in the DataBaseLag operator may include the name of the variable in which lags are stored, the location in the database where the variable is stored, the number of lags to be stored, the time period over which the variable is lagged, the name of the database where the variable is stored, and the variable type.

In general, the name of the variable in which lags are stored is identified by the corresponding merchant category code, and the time period on which the variable is lagged may be specified such that every transaction performed over a week, for example, may be accessed. In the described embodiment, it may be assumed that the specified period of time is a week, and that the variable relates to cash withdrawals.

Once the DataBaseLags operator is invoked, the Atomic operator that is a part of Class "2" 410 is invoked, i.e., the precedence relationship indicated by arrow 420 is followed, to read the appropriate data from the location identified within the database. In other words, the Atomic operator is used to parse the string containing the transactions performed over the last week by the account holder.

Once the relevant information has been obtained, the Histogram operator that is associated with Class "4" 414 is invoked in the described embodiment. The precedence relationship between Class "2" 410 and Class "4" 414 is defined by arrow 432. The Histogram operator may be used such that the data obtained using the Atomic operator may, in essence, be sorted. That is, the Histogram operator may be used to generate statistics related to cash withdrawals. For example, Histogram operator may be used to identify the type of cash withdrawals, e.g., cash withdrawals which exceed a given value, which were most frequently made over the course of the last week. It should be appreciated that in the event that the frequency is the same for more than one type of cash withdrawals, e g., two different types of cash withdrawals, then Histogram operator will generally select the first occurrence of either of the types of cash withdrawal as being the type of purchase with the highest frequency.

Histogram operator may be called with an argument which specifies a lag depth. This lag depth may be used to specify the number of cash withdrawals of a particular amount, for example, that is considered to be a high frequency type of cash withdrawal. For example, a lag depth of five may imply that the number of times a particular type of cash withdrawal has been made must exceed five before that type of cash withdrawal is considered to be a type of cash withdrawal that is frequently made.

After the type of cash withdrawal that is most frequently made is identified, in the described embodiment, the ArraySparse operator may be called to identify a risk associated with the most frequently made cash withdrawal type. The ArraySparse operator may be called directly after the Histogram operator is called due to the precedence relationship, defined by arrow 428, between Class "3" 412, with which the ArraySparse operator is associated, and Class "4" 414, with which the Histogram operator is associated. It should be appreciated that the ArraySparse operator may generally be used to associate a risk value with the type of cash withdrawal that most frequently occurs by accessing an array of risk values. This risk value may then be passed to a risk prediction model, as previously mentioned.

It should be appreciated that in the event that an account holder possesses more than one account, e.g., has more than one bankcard, the risk value associated with the type of cash withdrawal that most frequently occurs may be determined for each account. In this case, the JoinHistogram operator associated with Class "5" 416 may be invoked to determine the overall type of cash withdrawal that most frequently occurs over all related accounts, or accounts owned by one account holder. Then, a risk value may be determined for that type of cash withdrawal using the ArraySparse operator.

Although only a few embodiments of the present invention have been described, it should be understood that the present invention may be embodied in many other specific forms without departing from the spirit or scope of the invention. By way of example, although the minimum number of necessary operators have been divided into five classes, it should be appreciated that the number of classes may vary. In some cases, classes may be combined. In other cases, classes may be divided, e.g., the simple transformations subclass and the complex transformations subclass of the entity transformations class may be considered to be separate classes.

Further, although a general precedence relationship has been described for operators contained within classes, it should be appreciated that in some cases, it is possible that it may not be appropriate for a particular operator in one class to directly precede a particular operator in another class. However, in such cases, at least one operator in a given class will be suitable for preceding an operator in another class, as specified by the precedence relationship.

Although the operators have been described as taking certain arguments, it should be appreciated that the arguments may be widely varied without departing from the spirit or the scope of the present invention. By way of example, the IndexRead operator may include a statistical argument which may be used to determine the number of statistics to be read in from an index table, i.e., the number of statistics associated with each parameter that is read from the index table. Therefore, the present examples are to be considered as illustrative and not restrictive, and the invention is not to be limited to the details given herein, but may be modified within the scope of the appended claims.

What is claimed is:

1. A computer-implemented method for transforming scoreable transaction data into a financial data feature for use in assessing credit risk, the method comprising:

obtaining the scoreable transaction data from a data source; and performing a set of operations on the scoreable transaction data to transform the scoreable transaction data into the financial data feature, the set of operations being selected only from a predefined set of classes of operations, the set of predefined classes of operations being arranged in a predefined order of precedence, wherein each operation in the set of operations is performed in an order based on the predefined order of precedence of a class associated with the each operator, the set of predefined classes of operations including only classes selected from the group consisting of a data structure class, an atomic transformation class, an entity transformation class, a time transformation class, and a joining operator class.

2. A computer-implemented method as recited in claim 1 wherein the financial data feature is configured for use in a risk prediction model, the computer-implemented method further including:

providing the financial data feature to a risk prediction model.

3. A computer-implemented method as recited in claim 2 further including:

implementing the risk prediction model the financial data feature; and assessing a risk of bankruptcy based on as result of the implementation of the risk prediction model.

4. A computer-implemented method as recited in claim 2 wherein the financial data feature is further configured for use in a transaction scoring process associated with the risk prediction model, the computer-implemented method further including:

providing the financial data feature to the transaction scoring process.

5. A computer-implemented method as recited in claim 1 wherein the set of operations are performed substantially in real-time.

6. A computer-implemented method as recited in claim 1 further including replacing the predefined order of precedence with a second predefined order of precedence in order to transform the scoreable transaction into a second financial data feature.

7. A computer-implemented method as recited in claim 6 wherein the scoreable transaction data includes the financial data feature, the second financial data feature, and additional data, the computer-implemented method further including:

providing the financial data feature and the second financial data feature, and not the additional data, to a credit risk prediction model.

8. A computer-implemented as recited in claim 2 wherein the risk prediction model is arranged to assess a level of credit risk using the financial data feature.

* * * * *